United States Patent [19]

Johnson

[11] 4,253,606

[45] Mar. 3, 1981

[54] AUTOMATIC SPRINKLER CONTROL

[76] Inventor: Lonnie G. Johnson, 1463 E. Barkley Dr., Mobile, Ala. 36606

[21] Appl. No.: 71,110

[22] Filed: Aug. 30, 1979

[51] Int. Cl.³ .............................................. A01G 25/00
[52] U.S. Cl. ..................................... 239/63; 137/78.3
[58] Field of Search ............. 239/63, 64, 65, DIG. 15, 239/67; 137/78

[56] References Cited

U.S. PATENT DOCUMENTS 2,675,817  4/1954  Hartlett ............................. 239/64 X
3,981,446  9/1976  Hunter ............................... 239/63 X Primary Examiner—Richard A. Schacher

[57] ABSTRACT

An automatic water control valve for a lawn sprinkler system for maintaining soil moisture at a preset level. A spring loaded mechanism opens the valve when released by a water sensitive element which monitors the moisture content of the ground area serviced by the sprinkler system. A closing mechanism which is actuated by water flowing through the valve automatically resets the spring loaded opening mechanism and closes the valve after a fixed quantity of water flow.

3 Claims, 4 Drawing Figures

U.S. Patent
Mar. 3, 1981
4,253,606
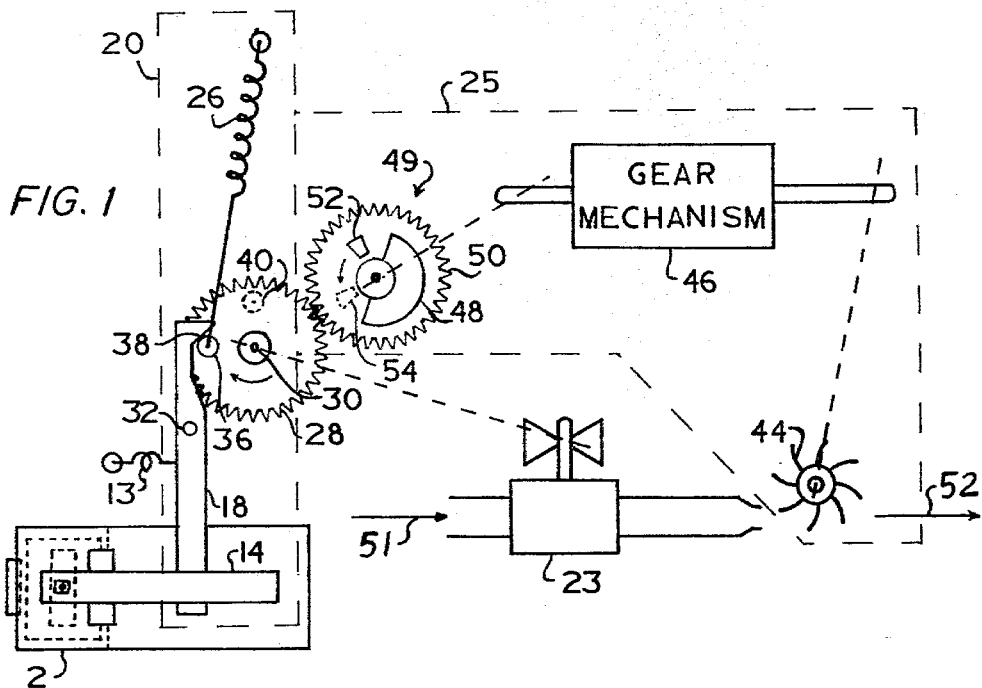
FIG. 1
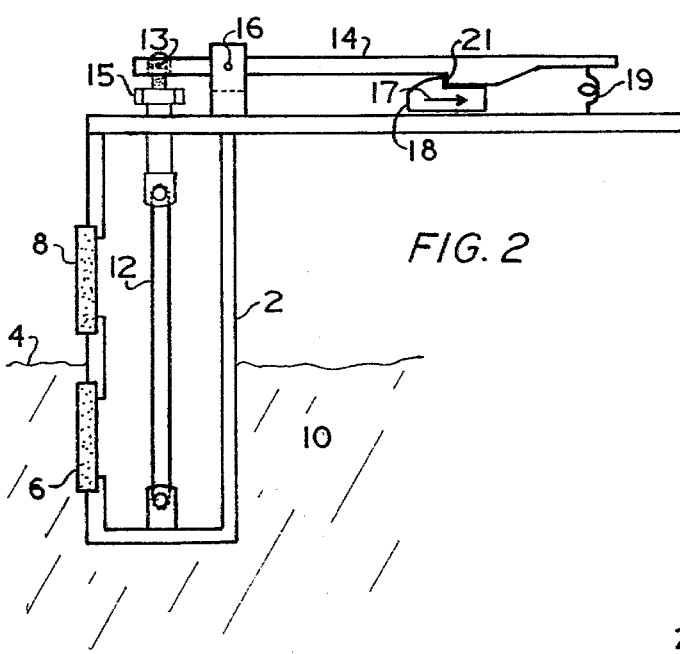
FIG. 2
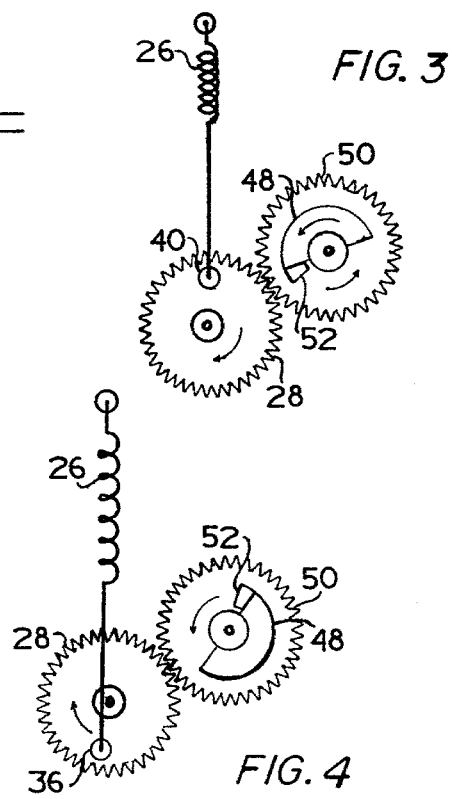
FIG. 3
FIG. 4

4,253,606

AUTOMATIC SPRINKLER CONTROL

BACKGROUND AND SUMMARY

The present invention includes a water control valve as an integral part and functions as a water conservation device by turning a lawn sprinkler system on only when necessary. A humidity sensitive element is located in a chamber which is positioned partially below ground level. Diffusion ports maintain the humidity inside the chamber at a level which depends on ambient humidity and on the amount of moisture in the soil. The sensitive element shrinks with reductions in humidity inside the chamber, releases a spring loaded mechanism which opens the water control valve, and thereby turns on the sprinkler system. The sensing element responds to moisture increases caused by on states of the sprinkler system.

Water flowing through the valve rotates an impeller which is coupled to a reduction gear mechanism. With the completion of a fixed number of rotations of the impeller corresponding to a fixed volume of water flow, the reduction gear mechanism resets the spring loaded opening mechanism and closes the valve. The valve remains closed until the humidity sensitive element triggers another on cycle.

The present invention is an improvement over conventional sprinkler control systems which utilize electronic techniques for sensing moisture in that it does not require an electrical power source. Because of this, it can operate under specialized conditions. This includes functioning as an integral part of a lawn sprinkler. This type of sprinkler could be attached to the exit end of a water hose and could control itself with no additional installation requirements.

BRIEF DESCRIPTION OF THE DRAWINGS

FIG. 1 is a diagram which depicts a device representative of the present invention. The drawing shows a flow control valve, a spring loaded opening mechanism, an impeller, a reduction gear mechanism, a humidity chamber and a reset mechanism.

FIG. 2 shows a humidity sensitive element positioned inside a humidity chamber which has diffusion ports for monitoring soil moisture and ambient humidity. FIG. 2 also shows a moisture level control.

FIG. 3 depicts the initial phase of operation of the reset mechanism. The reset mechanism is shown returning the spring loaded opening mechanism to an initial state.

FIG. 4 depicts the final phase of operation of the reset mechanism.

DETAILED DESCRIPTION AND PREFERRED EMBODIMENT OF THE INVENTION

An understanding of the operation of the present invention can be derived from the following description with reference to the drawings. FIG. 2 shows humidity chamber 2 partially positioned below ground surface level 4. Diffusion ports 6 and 8 are constructed of a porous material. Diffusion port 6 couples the humidity level inside chamber 2 to the level of moisture in soil 10. Simularly, diffusion port 8 couples the humidity level inside chamber 2 to the humidity level of the surrounding ambient air. The ports maintain the humidity level inside chamber 2 at a point between ground moisture and ambient humidity. Moisture sensitive element 12 shrinks with decreases in the moisture level inside chamber 2. Its movement is coupled to latch release lever 14 by sensitivity adjustment 15. Operation of the humidity chamber is such that sufficient soil moisture causes element 12 to assume an extended state allowing spring 19 to hold lever 14 in a clockwise most position and thereby inhibiting motion of lever 18 at catch point 21. Lever 18 is spring loaded to move in the direction of arrow 17. Shrinkage of sensitive element 12 with decreases in soil moisture pulls lever 14 down at connection point 13 of sensitivity adjustment 15. This motion rotates lever 14 counterclockwise about pivot joint 16 and releases spring loaded lever 18. Sensitivity adjustment 15 controls the amount of shrinkage of sensitive element 12 required to release lever 18. Adjustment 15 is a screw and threaded sleeve combination which is adjusted by turning the threaded sleeve about the screw and setting sensitive element 12 to be tight or loose at a given chamber internal humidity level. Once lever 18 has been released, increases in soil moisture content causes sensitive element 12 to expand returning lever 14 to its most clockwise position. Lever 18 can then be reset by motion in the direction opposite to arrow 17 allowing catch 21 to re-engage.

Referring to FIG. 1, release of level 18 by lever 14 allows spring loaded valve opening mechanism 20 to open valve 23. Releasing level 18 allows spring 26 to rotate gear 28 clockwise about pivot point 30 forcing counterclockwise rotation of lever 18 about pivot joint 32 by motion of latch member 36 against slanted edge 38. Spring 26 rotates gear 28 moving latch member 36 to position 40. This rotation opens valve 23 allowing water to flow to the controlled sprinkler system.

Valve closing mechanism 25 is comprised of impeller 44, reduction gear mechanism 46 and reset mechanism 49. When valve 23 is open, water flowing through rotates impeller 44. Impeller 44 is coupled to reduction gear mechanism 46 which is in turn coupled to catch 48. Catch 48 and gear 50 share rotation centers. Gear 50 meshes with gear 28 so that movement of latch member 36 (attached to gear 28) to position 40 to open valve 23 rotates gear 50 moving stop 52 to position 54. Stop 52 is attached to gear 50. Reduction gear mechanism 46 provides the mechanical advantage necessary for rotation of impeller 44 to return spring 26 to its initial position closing valve 23.

As illustrated in FIG. 3, rotation of catch 48 by reduction gear mechanism 46 causes catch 48 to engage stop 52. Continued motion of catch 48 rotates gear 50 and thereby rotates gear 28 moving latch member 36. This motion extends spring 26 as shown in FIG. 4. As the motion continues, spring 26 takes control and closes valve 23 by moving catch 36 to its original position engaged with lever 18 and moving stop 52 to its original position disengaged with catch 48. Movement of gear 28 to its original position by spring 26 is a snap action. Movement of catch 36 from position 40 back to its original position requires a fixed number of rotations of impeller 44. Because of this, the valve can be designed to shut off after a fixed volume of water flow.

Since humidity chamber 2 has diffusion ports both above and below ground, ambient humidity conditions also influence the conditions for opening valve 23. The humidity level inside chamber 2 is maintained between soil and ambient moisture levels. Since a high ambient humidity indicates a high potential for rain, a device representative of the present invention can, to a limited extent, anticipate rainy conditions and prevent on states of the controlled sprinkler system.

Referring to FIG. 1, water enters valve 23 from a source (not shown) as indicated by arrow 51 and exits to the controlled sprinkler system (not shown) as indicated by arrow 52. Water exiting the valve causes impeller 44 to rotate. An alternate version of the present invention would be to allow the water to exit through a rotating sprinkler head used in place of impeller 44. The sprinkler control would then include a sprinkler as an integral part and could be attached to the exit end of a water hose and control itself to maintain a desired soil moisture level.

What is claimed is:

1. An automatic sprinkler control for maintaining soil moisture of the ground area serviced by a lawn sprinkler system at a preset level by controlling the flow of water to said sprinkler system, said automatic sprinkler control being sensitive to the moisture content of the ground and of the aboveground ambient air and comprising:
   a. a water valve means for controlling water flow to said sprinkler system,
   b. a humidity chamber means, a humidity sensitive element means and a latch means, said humidity chamber means being positioned within the ground area serviced by said sprinkler system and maintaining an internal humidity level which depends on the soil moisture level of the ground area serviced and on the aboveground ambient humidity, said humidity sensitive element means being positioned inside said humidity chamber means and coupled to said latch means, said humidity sensitive element means responding to changes in soil moisture considered with ambient humidity by causing said latch means to move,
   c. a spring loaded valve opening mechanism means and a sensitivity adjustment means, said spring loaded opening mechanism means being operatively coupled to said water valve means and having an initial state such that said water valve means is closed, said latch means being operatively coupled to said spring loaded opening mechanism means, said humidity sensitive element means causing said latch means to be positioned so as to prevent motion of said spring loaded opening mechanism means from an initial state when the soil moisture of the ground area serviced considered with ambient humidity is above a desired level, said humidity sensitive element means responding to drops in soil moisture considered with ambient humidity below a desired level by causing said latch means to be positioned so as to permit motion of said spring loaded opening mechanism means, said spring loaded opening mechanism means in turn moving to open said water valve means allowing water to flow to said sprinkler system, said sensitivity adjustment means being coupled to said humidity sensitive element means and controlling the level of internal humidity of said humidity chamber means below which said humidity sensitive element means initiates open states of said water valve means and thereby functioning as a means for selecting a desired level of soil moisture considered with ambient humidity to be maintained by said automatic sprinkler control,
   d. a valve closing mechanism means, said valve closing mechanism means being coupled to said spring loaded opening mechanism means and including an impeller means, a reduction gear mechanism means and a reset mechanism means, said impeller means being coupled to said reduction gear mechanism means and said reduction gear mechanism means being coupled to said reset mechanism means, said impeller means being actuated by water flowing through said water valve means when said water valve means is in an open state, said reduction gear mechanism means being actuated by said impeller means and facilitating a mechanical advantage for rotation of said impeller means to actuate said reset mechanism means and return said spring loaded opening mechanism means to an initial state closing said water valve means, said water valve means being closed after a fixed number of rotations of said impeller means and thereby being closed after a fixed volume of water has been permitted to flow to said sprinkler system.

2. An automatic sprinkler control as described in claim 1 wherein said humidity chamber means includes diffusion port means, said diffusion port means being positioned to facilitate diffusion of moisture in and out of said humidity chamber means both above and below ground level.

3. An automatic sprinkler control as described in claim 1 wherein said impeller means comprises a rotating sprinkler head of said sprinkler system.

* * * * *